United States Patent Office 3,413,322
Patented Nov. 26, 1968

3,413,322
TRIFLUOROACETATE SALTS OF ESTERAMINES AS PAINT ADDITIVES
Joseph A. Vasta, Woodbury, N.J., assignor to E. I. du Pont de Nemours and Company, Wilmington, Del., a corporation of Delaware
No Drawing. Continuation-in-part of application Ser. No. 414,434, Nov. 27, 1964. This application Dec. 21, 1967, Ser. No. 692,309
2 Claims. (Cl. 260—404)

ABSTRACT OF THE DISCLOSURE

A certain type of salt compound is disclosed which is useful as an additive in paints and other film-forming compositions to improve pigment-wetting and flow properties, and especially useful to render many paints suitable for application by electrostatic spray techniques; it is disclosed that the novel salt compound can be made by reacting trifluoroacetic acid with a tertiary amine compound obtained from the reaction between a primary

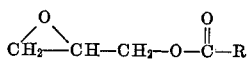

amine (e.g., lauryl amine) and an ester of the formula wherein R is a branched chain $C_8$—$C_{10}$ alkyl group.

CROSS REFERENCE TO RELATED APPLICATION

This is a continuation-in-part of my patent application Ser. No. 414,434 filed Nov. 27, 1964, now abandoned.

BACKGROUND OF THE INVENTION

This invention relates to chemical compounds which are useful as conductivity-enhancing additives for paints and the like, and to paint compositions containing such compounds. The invention is especially concerned with additives adapted for use in rendering paints and other film-forming compositions suitable for application by electrostatic spray techniques.

It is known that to achieve satisfactory application of a liquid coating composition by electrostatic spray techniques, the composition must have an electrical resistance of about 100,000–500,000 ohms. The many coating compositions useful for protective and decorative purposes which have higher electrical resistances must be treated to reduce their electrical resistance if application by this method is desired. It is a customray expedient to increase the conductivity (reduce the resistance) of these compositions by addition of polar solvents or other additives, but the known additives have been unsatisfactory for a variety of reasons.

For example, most polar solvents are costly; and the less expensive ones, such as methanol, are too volatile for satisfactory use. Many additives which have been used to reduce electrical resistance of paints are unsatisfactory because of their adverse effects on the quality of the coating composition itself. In some instances these so-called electrostat depressants are effective but only for an unduly short period of time. Some known additives depress the electrical resistance of a composition quite well initially, but in a few days or weeks the electrical resistance rises again to exceed the highest level permissible for electrostatic spraying. Other additives are extremely limited in their utility for this purpose due to their low solubility in the preferred solvents of the coating compositions.

SUMMARY OF THE INVENTION

The present invention provides a new salt compound which may be broadly defined as a trifluoroacetate salt of a compound from the group having the structural formulas

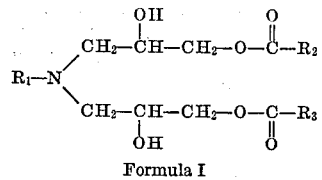

Formula I and

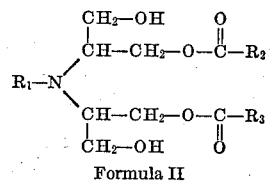

Formula II wherein $R_1$ is a $C_1$–$C_{12}$ alkyl group, a $C_4$–$C_7$ alicyclic group, or an aryl-, alkaryl-, or aralkyl group containing less than 19 carbon atoms, and $R_2$ and $R_3$ are branched chain $C_8$–$C_{10}$ alkyl groups.

The invention also provides a liquid coating composition containing a film-forming component and about 0.5–10 pounds of the salt compound described in the previous paragraph per 100 gallons of said composition.

DESCRIPTION OF PREFERRED EMBODIMENTS

With reference to $R_1$ of Formulas I and II above, lauryl is a preferred alkyl group. $R_1$ can also be one of the other groups listed above, including an alicyclic group (e.g., cyclohexyl), an aryl group (e.g., phenyl) an alkaryl group (e.g., tolyl), or an aralkyl group (e.g., benzyl). The novel salt compound is a trifluoroacetate salt of either or both of the compounds of Formulas I and II.

The structure of the salt of Formula I can be illustrated as follows:

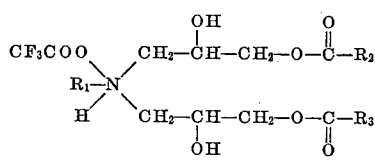

The new salt compound can be prepared by reacting trifluoroacetic acid with a tertiary amine compound of Formula I, Formula II, or mixtures of such formulas. These tertiary amines can be prepared by reacting a suitable primary amine having the formula $R_1NH_2$, such as lauryl amine, with a glycidyl ester having the formula

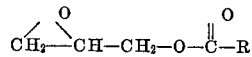

where R is a branched chain $C_8$–$C_{10}$ alkyl group. Preparation of such compounds is known in the art. The amine is reacted with the glycidyl ester at normal atmospheric pressure and at elevated temperature, usually greater than about 60° C. and preferably in the range of about 60–150° C. A reaction time of about 0.5 to 4 hours is usually sufficient to produce the tertiary amines.

Many known paints and other liquid coating compositions which are not useful for application to substrates by electrostatic spray techniques because of insufficient electrical conductivity can be converted to very useful electrostatic spray compositions by admixing therewith a small amount of the novel salt compound. About 0.5–10.0 pounds of the salt compound per 100 gallons of coating composition is usually sufficient to obtain the desired level of electrical conductivity.

Coating compositions of the present invention, because of the presence of the novel salt compound, have a decided tendency towards improved pigment-wetting properties and improved flow properties. The compositions also tend to retain suitable conductivity for electrostatic spray application over extended periods of time.

A preferred embodiment of the coating composition of this invention is one that is formulated for use as a baking enamel; such a composition contains enough of any suitable known pigment to give the desired color, enough of the novel salt compound to give the desired electrical conductivity, and enough of any suitable known baking-enamel type of film-forming component adapted to form a coating of suitable durability when the applied coating is dried or cured in an oven or other heat zone properly heated to an elevated temperature. The composition will of course also contain a volatile organic solvent or other suitable liquid medium in an amount sufficient to provide the desired viscosity. The proportions of the various known ingredients will be generally the same as is known in the art to be satisfactory. Among the useful baking-enamel type film-formers are alkyd resins, oil-modified alkyd resins, urea and melamine formaldehyde resins, styrene/glycidyl ester copolymers and the like.

Another preferred embodiment of the coating composition is one that is formulated for use as a lacquer; such a composition can be either nonpigmented or it can contain enough of any suitable known pigment to give the desired color. Enough of the novel salt compound is added to give the desired electrical conductivity, enough of a volatile organic solvent or the like is added to give the desired viscosity, and enough of any suitable known lacquer-type film-forming component is used which forms a coating of suitable durability when the coating is dried at or near ordinary room temperature. Among the useful lacquer-type film-forming components are cellulose nitrate, cellulose acetate butyrate, polymethyl methacrylate and polyvinyl chloride.

The examples which follow are given for the purpose of illustrating the invention. All quantities shown are on a weight basis unless otherwise indicated.

Example 1

A salt compound of the present invention is prepared as follows:

Lauryl amine (205 parts) and 490 parts "Cardura" E (a mixed glycidyl ester of a synthetic tertiary carboxylic acid, having the formula

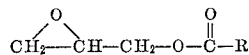

where R is a tertiary aliphatic hydrocarbon group of 8–10 carbon atoms) are charged into a reaction vessel and heated at 120° C. for two hours. The resulting tertiary amine product is a mixture of compounds having the structures of Formulas I and II in which $R_1$ is lauryl, and $R_2$ and $R_3$ are each $C_8$–$C_{10}$ tertiary aliphatic alkyl groups. The amine product is separated and recovered by conventional means. An analysis of the recovered tertiary amine mixture is presented below:

|  | Calculated | Found |
| --- | --- | --- |
| Percent non-volatile solids | 100 | 98.75 |
| Percent hydroxyl | 4.8 | 4.24 |
| Percent nitrogen | 2.0 | 2.03 |

Glacial trifluoroacetic acid (265 parts) is mixed with 35 parts of the tertiary amine mixture prepared above, and the resulting mixture is heated at 60° C. for one hour. The trifluoroacetate salt of the tertiary amine is obtained.

Example 2

A baking enamel is prepared using the following ingredients:

Part A—
First portion: Parts by weight
Industrial xylol, 10° _____ 156.4
High solvency petroleum naptha _____ 156.2
"Cardura" E (as in Example 1) _____ 117.5
Second portion:
Styrene _____ 239.1
Acrylic acid _____ 41.9
Di-tertiary butyl peroxide _____ 4.0
Benzyltrimethylammonium hydroxide,
40% solution in methanol _____ 2.0
Third portion:
Butanol _____ 7.9

The first portion is charged into a reactor and heated to reflux temperature.

The ingredients of the second portion are mixed and then added to the reactor over a two-hour period. The resulting solution is then held at reflux temperature for three hours.

Heat is withdrawn and the solution is cooled and thinned with the third portion to give a copolymer solution containing 50% solids, and having a Gardner-Holdt viscosity of T.

The following polymer has an acid number of 15; it is the copolymerization and esterification product of the following reactants in the listed proportions:

| | Percent |
| --- | --- |
| Styrene | 60 |
| "Cardura" E | 29 |
| Acrylic acid | 11 |
| | 100 |

The above polymer is used to make a baking enamel using the following formulation:

Part B—
First portion: Parts by weight
Part A copolymer solution, 50% polymer content _____ 87.45
Industrial xylol, 10° _____ 65.59
Titanium dioxide pigment, rutile ____ 284.21
Second portion:
Part A copolymer solution, 50% polymer content _____ 291.50
Melamine-formaldehyde resin solution,
55% in butanol _____ 227.60
Third Portion:
Industrial xylol, 10° _____ 43.65

Portion One of Part B is ground in a sand mill, and the second and third portions are then blended into this mill base.

The trifluoroacetate salt of Example 1 (10 parts) is intimately mixed with 1000 parts of the baking enamel thus prepared. Prior to addition of the salt the enamel has an electrical resistance of about 850,000 ohms, but after adding the salt its electrical resistance is 175,000 ohms. The enamel is readily applied to metal substrates by known electrostatic spray techniques. Aging of the enamel at 120° F. for four weeks resulted in no change in electrical resistance. This was in contrast with another portion of the enamel treated with a commercially available electrostat depressant, believed to be a quaternary ammonium salt; although the electrical resistance of this comparative sample of enamel was quite well depressed initially, it returned during the four week period to its original electrical resistance, which was much too high to permit its application by electrostatic spraying.

When another portion of the enamel is treated with a like amount of the tertiary amine obtained in Example 1 instead of using the salt, the electrical resistance is not nearly as well depressed initially, and after the four week aging period, the electrical resistance of this comparative sample of enamel is too high for satisfactory electrostatic spray application.

When Example 2 is repeated except the trifluoroacetate salt is added to Portion One of Part B before the sand mill grinding step, the presence of the salt provides improved pigment-wetting, and a more uniformly ground pigment is obtained. The resulting enamel has improved flow properties, and it is well suited for electrostatic spray application.

I claim:

1. As a new salt compound, a trifluoroacetate salt of a compound from the group having the structural formulas

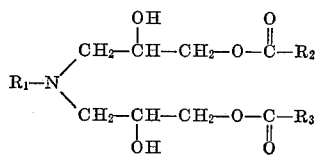

and

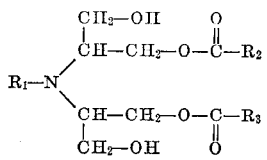

wherein $R_1$ is a radical selected from the group consisting of $C_1$–$C_{12}$ alkyl, $C_4$–$C_7$ alicyclic, phenyl, $C_1$–$C_{12}$ alkyl substituted phenyl, and phenyl substituted $C_1$–$C_{12}$ alkyl, and $R_2$ and $R_3$ are branched chain $C_8$–$C_{10}$ alkyl groups.

2. The salt compound of claim 1 in which $R_1$ is lauryl.

No references cited.

NICHOLAS S. RIZZO, *Primary Examiner.*

F. A. MIKA, *Assistant Examiner.*